Dec. 24, 1968          F. J. KELLY          3,418,013
              NONSPINNING THREADED FASTENER
                   Filed Aug. 22, 1966

FRANCIS J. KELLY
INVENTOR.

BY John R. Faulkner
   Glenn S. Arendsen

ATTORNEYS

United States Patent Office 3,418,013
Patented Dec. 24, 1968

3,418,013
NONSPINNING THREADED FASTENER
Francis J. Kelly, Farmington, Mich., assignor to Ford Motor Company, Dearborn, Mich., a corporation of Delaware
Filed Aug. 22, 1966, Ser. No. 574,221
5 Claims. (Cl. 287—189.36)

ABSTRACT OF THE DISCLOSURE

Screw threads with flattened crests such as Acme, square, or worm threads are formed adjacent the head of a bolt and conventional threads of the opposite hand are formed on the end of the bolt cylindrical portion. The threads adjacent the head frictionally contact the surface of the hole in one of the members being fastened and the friction force generated thereby draws the bolt head into contact with the fastened member.

---

This invention provides a threaded fastener that prevents itself from turning when torque is applied to a nut threadably engaging threads on the fastener to tighten the fastener into an assembly.

Ordinary bolts, cap screws, and other threaded fasteners tend to turn or spin under the torque applied to threaded nuts when tightening the fastener into an assembly. This necessitates holding the head of the bolt with one wrench while turning the nut with another wrench or designing the member being fastened with a shape that will engage the bolt head. Both of these known techniques are expensive, the former because of the man power required and the latter because of the machining. In basically mechanical industries such as vehicle production where threaded fasteners are used widely, these expenses can become astronomical. In addition, the difficulties decrease the effectiveness of power tools used to torque threaded nuts onto threaded fasteners.

The threaded fastener provided by this invention has a head at one end and conventional screw threads at the other end for engaging a threaded nut. Adjacent the head, a second set of screw threads having a hand opposite the hand of the conventional screw threads is provided. As the nut is turned on the fastener, the screw threads adjacent the head contact the surfaces of the hole in the member adjacent the head that is being fastened and thereby draw the head into contact with the member. Friction between the head, the adjacent screw threads and the member is sufficient to prevent the threaded fastener from spinning.

Flat crests on the threads adjacent the heads are preferred in the fasteners of this invention because they provide a larger frictional surface. Also, flat crests have less tendency to cut into the member being fastened which can cause the threaded member to stop turning before the head contacts the member, thereby giving the appearance of a thoroughly fastened assembly when in fact small loads will loosen the assembly to the extent of the gap that exists.

The pitch of the thread adjacent the head preferably is no greater than the thickness of the wall of the member adjacent the head. This insures that at least one full revolution of thread is in contact with the wall, thereby providing necessary contact area. If desired, multiple threads can be used to increase thread contact area without decreasing thread lead.

Details of construction and additional advantages are presented in the following description of the drawings in which.

Figure 1:
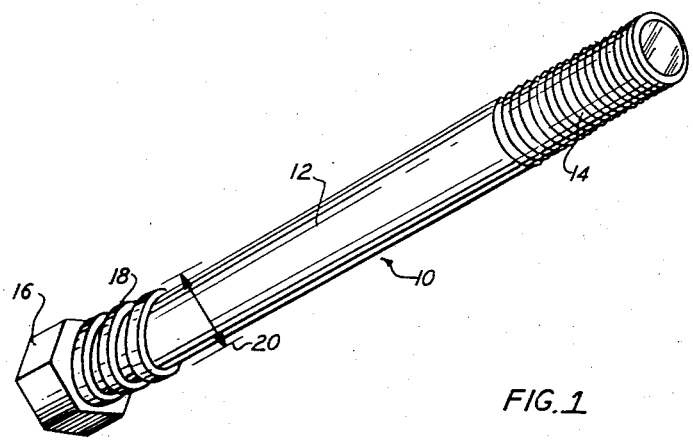
FIGURE 1 is a side view of the threaded fastener of this invention.
Figure 2:
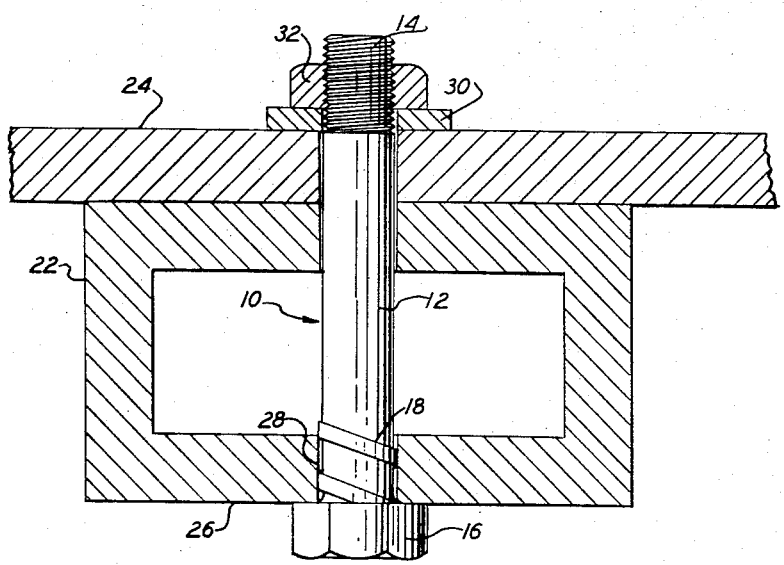
FIGURE 2 is a cross-sectional view an an assembly of two members fastened by the threaded fastener.

Referring to FIGURE 1, the threaded fastener 10 comprises an elongated cylindrical portion 12 having conventional screw threads 14 on one end adapted to engage a conventional threaded nut 32 shown in FIGURE 2. Threads 14 are right handed; turning a nut in a clockwise direction, looking at the end of the fastener 10, moves the nut along the threads toward the head of the fastener.

A head 16 is formed at the other end of the fastener. Adjacent head 16, a second set of threads 18 is formed on cylindrical portion 12. Threads 18 are left handed and have a major diameter 20 greater than the diameter of the remainder of portion 12. Threads 18 shown in the drawings are Acme threads. Other thread forms useful as threads 18 include the square and worm threads. Acme threads provide a good combination of crest area and strength and are preferred for this reason.

FIGURE 2 shows a fastened assembly in which a box section first member 22 is fastened to a second member 24 by threaded fastener 10. Wall 26 of first member 22 has a hole 28 therein. The crests of threads 18 frictionally contact the surface of hole 28, and the flat side of head 16 contacts the perpendicular surface of wall 26.

Threaded member 10 passes through appropriate holes in the other wall of first member 22 and second member 24. A washer 30 bears on the open surface of second member 24, and threaded nut 32 threadably engages screw threads 14 and bears on washer 30.

The fastened assembly is effected by inserting fastener 10 through the holes in first and second members 22 and 24 until contact is established between threads 18 and hole 28. At this point a short space still exists between head 16 and wall 26. Washer 30 is then placed over threads 14, and nut 32 is placed into threaded engagement with threads 14. As nut 32 is turned clockwise to tighten the assembly, threaded fastener 10 spins in the same direction. Friction between threads 18 and hole 28 then draws the fastener into hole 28 until head 16 contacts wall 26. Friction between head 16 and wall 26 and between threads 18 and hole 28 then combines to stop the spinning of fastener 10. Continued turning of nut 32 then tightens the assembly.

Thus, this invention provides a nonspinning threaded fastener that uses friction between screw threads and a member being fastened to draw the head of the fastener into contact with the member, thereby eliminating the need for holding the fastener during assembly. With appropriate amounts of contact area, the threaded fastener will prevent spinning under torques necessary for most applications. For higher torques, the hole in the first member and the screw threads adjacent the head can be designed to produce elastic, or even further, plastic metal flow when the assembly is being tightened.

What is claimed is:
1. A fastened assembly comprising
   a first member made of metal and having a hole therein, said hole being essentially cylindrical and having essentially smooth walls,
   a second member,
   a cylindrical threaded member having a head at one end, screw threads of one hand adjacent said head and screw threads of the other hand on the other end, and a nut for threadably engaging the latter screw threads, said threaded member passing through the hole in the first member to fasten the first and second members with the first member adjacent said head, the screw threads adjacent the head having flat crests and a major diameter greater than the diameter of the remainder of said threaded member, the width of the flat portions of said flat crests being at least the width of the crest of a worm thread of a corresponding size, the diameter of the flat crests being greater than the diameter of the hole in said first member so said flat crests contact frictionally the surfaces of the hole in the first member, the frictional force between the flat portions of the threads adjacent the head and the surfaces of the hole in the first member drawing the head of said threaded member into contact with the first member when the threaded member is turned by a torque tending to tighten said nut on the screw threads at the end of the threaded member.

2. The assembly of claim 1 in which the pitch of the thread adjacent the head is no greater than the thickness of the first member.

3. The assembly of claim 2 in which metal flow is produced by the screw threads adjacent the head when the threaded fastener is turned.

4. The assembly of claim 1 in which metal flow is produced by the screw threads adjacent the head when the threaded fastener is turned.

5. The fastened assembly of claim 1 in which the cylindrical threaded member is sufficiently long to expose the screw threads on the end thereof to the threads of an internally threaded member although the threads adjacent the head have not entered the hole in said first member, said frictional forces drawing the head into contact with said first member when the internally threaded member is rotated in the tightening direction while engaging the screw threads on the end of the cylindrical member.

References Cited
UNITED STATES PATENTS

| | | | |
|---|---|---|---|
| 244,510 | 7/1881 | Abernathy | 151—16 |
| 1,028,795 | 6/1912 | Steinhouse | 85—46 |
| 2,787,186 | 4/1957 | Brogiotti | 85—46 |
| 3,124,031 | 3/1964 | Knohl | 151—16 |

EDWARD C. ALLEN, *Primary Examiner.*

U.S. Cl. X.R.

151—69, 70